United States Patent
Chae et al.

(10) Patent No.: US 11,194,338 B2
(45) Date of Patent: Dec. 7, 2021

(54) METHOD FOR RECOMMENDING LOCATION OF CHARGING STATION AND MOVING ROBOT PERFORMING THE SAME

(71) Applicant: LG ELECTRONICS INC., Seoul (KR)

(72) Inventors: Jong Hoon Chae, Seoul (KR); Tae Hyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 185 days.

(21) Appl. No.: 16/701,058

(22) Filed: Dec. 2, 2019

(65) Prior Publication Data

US 2020/0387164 A1    Dec. 10, 2020

(30) Foreign Application Priority Data

Jun. 4, 2019 (KR) .......................... 10-2019-0066082

(51) Int. Cl.
*G05D 1/02* (2020.01)
*G06N 20/00* (2019.01)
*G05D 1/00* (2006.01)

(52) U.S. Cl.
CPC ......... *G05D 1/0225* (2013.01); *G05D 1/0088* (2013.01); *G06N 20/00* (2019.01); *G05D 2201/0203* (2013.01)

(58) Field of Classification Search
CPC ............... G05D 1/0225; G05D 1/0088; G05D 2201/0203; G06N 20/00
See application file for complete search history.

(56) References Cited

U.S. PATENT DOCUMENTS

| 10,882,186 | B1 * | 1/2021 | Ebrahimi Afrouzi ........................ B25J 11/0085 |
| 2018/0299899 | A1 * | 10/2018 | Suvarna ................ A47L 9/2894 |
| 2019/0385042 | A1 * | 12/2019 | Lee ....................... G06N 3/0436 |

FOREIGN PATENT DOCUMENTS

| KR | 100766435 | 10/2007 |
| KR | 1020090104393 | 10/2009 |
| KR | 1020090104394 | 10/2009 |

(Continued)

OTHER PUBLICATIONS

Korean Intellectual Property Office Application Serial No. 10-2019-0066082, Korean Notice of Allowance dated Nov. 20, 2020, 4 pages.

*Primary Examiner* — Ramsey Refai
(74) *Attorney, Agent, or Firm* — Lee Hong Degerman Kang & Waimey

(57) ABSTRACT

The present disclosure relates to a mobile robot capable of communicating with peripheral devices via a 5G communication environment, and recommending an efficient movement route and a location of a charging station via machine learning performed based on such communication. When the mobile robot according to the present disclosure is travelling, a score may be assigned to areas of items according to a type of an item located within a movement space in which the mobile robot moves. Here, a plus score may be assigned to an item area where presence of a socket is verified. Further, a highest score may be assigned to a movement route having a shortest distance required for the mobile robot to return to a charging station which charges a battery of the mobile robot, among the movement routes on which the mobile robot moves.

20 Claims, 8 Drawing Sheets

(56) References Cited

FOREIGN PATENT DOCUMENTS

| | | |
|---|---|---|
| KR | 1020160097051 | 8/2016 |
| KR | 1020180083580 | 7/2018 |

\* cited by examiner

METHOD FOR RECOMMENDING LOCATION OF CHARGING STATION AND MOVING ROBOT PERFORMING THE SAME

CROSS-REFERENCE TO RELATED APPLICATION

Pursuant to 35 U.S.C. § 119(a), this application claims the benefit of earlier filing date and right of priority to Korean Application No. 10-2019-0066082, filed on Jun. 4, 2019, the contents of which are hereby incorporated by reference herein in its entirety.

TECHNICAL FIELD

The present disclosure relates to a method for recommending an optimal location of a charging station of a mobile robot, and a mobile robot rechargeable at the recommended recharging station. More particularly, the present disclosure relates to a technology for recommending an optimal location of a charging station of a mobile robot by determining a plurality of movement routes of the mobile robot and determining the presence of an item in an area where the charging station which charges a battery of the mobile robot can be located.

BACKGROUND ART

The following description merely provides background information related to embodiments of the present disclosure, and does not constitute conventional technology.

Robots have been developed for industrial use, and play a role in factory automation. Recently, application fields of robots are further broadening. For example, there are now robots for medical use, and aerospace robots. In addition, household robots for use at home are being developed. Among such robots, a robot capable of autonomously travelling is called a mobile robot.

In particular, a representative example of a mobile robot used at home may be a robot cleaner. A robot cleaner is a device configured to travel by itself in a certain area, and clean the area during travelling by sucking up dust or foreign substances around the robot cleaner.

The mobile robot has an automatic charging function, since such a mobile robot performs an operation while travelling by itself in a predetermined area. Through the automatic charging function, the mobile robot checks a remaining battery power amount by itself, and when the remaining battery power amount is less than a reference value, the mobile robot automatically returns to a charging station installed at a predetermined location within an area in which the mobile robot moves, and charges its battery. After the charging is completed by means of the automatic charging function, the mobile robot resumes the operation. As described above, a conventional method in which a mobile robot automatically returns to a charging station has a configuration in which a user who uses a robot cleaner places the charging station at an arbitrary location, and the mobile robot returns to the charging station when a remaining battery power amount of the mobile robot is less than a reference value based on stored information.

However, according to this method, a movement route of the mobile robot starts from a location of the charging station which is arbitrarily chosen by a user with no relation to a movement route on which the mobile robot actually moves, and the mobile robot then returns to the charging station. This may result in the remaining battery power amount being less than a reference value and the battery thus requiring charging despite the mobile robot not having moved throughout the entire movement space.

Therefore, an optimal location of the charging station should be suggested such that the time and distance required for the mobile robot to move throughout the entire movement space and return to the charging station may be reduced as much as possible.

As a specific example of a mobile robot which returns to a charging station depending on a remaining battery power amount, Korean Patent Registration No. 10-0766435, entitled "Returning system to charging station for moving robot" (hereinafter referred to as "Related Art 1"), discloses a mobile robot returning to a charging station exactly and rapidly according to guidance signals emitted differently from the charging station depending on a distance.

Related Art 1 relates to a technology directed to returning a mobile robot to a charging station. According to Related Art 1, the mobile robot may return to the charging station according to a result of calculating a direction of the charging station and distance information based on guidance signals emitted from the charging station. However, Related Art 1 does not specifically disclose a technology for suggesting an optimal location of the charging station such that the time and distance required for the mobile robot to move throughout the entire movement space and return to the charging station may be reduced.

That is, Related Art 1 considers only a circumstance in which the mobile robot efficiently returns to the charging station via control of signals emitted from the charging station for establishing a return path to the charging station. Therefore, a situation may still arise in which the remaining battery power amount is less than a reference value and the battery thus requires charging despite the mobile robot not having moved throughout the entire movement space.

In addition, Korean Patent Application Publication No. 10-2016-0097051, entitled "Apparatus for returning of robot and returning method thereof" (hereinafter referred to as "Related Art 2"), discloses an apparatus for returning a robot disposed on a charging station, which transmits a front signal and a plurality of distance signals in which the respective transmission distance from the charging station consecutively increases, so that a mobile robot is able to determine a location of the charging station in various directions.

According to Related Art 2, the front signal and the distance signals in which the respective transmission distance from a charging station consecutively increases are transmitted toward the mobile robot, and driving of the mobile robot is controlled in response to the transmitted signal.

That is, according to Related Art 2, the driving of the mobile robot is controlled in accordance with a type of signal. However, the technology disclosed in Related Art 2 is unable to suggest an optimal location of the charging station such that the time and distance required for the mobile robot to move throughout the entire movement space and return to the charging station are reduced.

Therefore, there is a need for a method for suggesting an optimal location of the charging station such that the time and distance required for the mobile robot to move throughout the entire movement space and return to the charging station are reduced.

RELATED ART DOCUMENTS

Related Art 1: Korean Patent Registration No. 10-0766435 (published on Oct. 5, 2007)

Related Art 2: Korean Patent Application Publication No. 10-2016-0097051 (published on Aug. 17, 2016)

DISCLOSURE OF INVENTION

Technical Problem

The present disclosure is directed to suggesting and recommending an appropriate location of a charging station which charges a battery of a mobile robot.

The present disclosure is further directed to learning a plurality of movement routes on which a mobile robot moves throughout the entire movement space and returns to a charging station, and suggesting and recommending, as a location of the charging station, a location on a movement route having the shortest time required for the mobile robot to return to the charging station among the learned plurality of movement routes.

The present disclosure is still further directed to assigning a score to areas of items located within a movement space in which a charging station can be located, and suggesting a location of the charging station based on an area where the highest score is assigned.

The present disclosure is still further directed to suggesting a location of a charging station based on a movement route having the shortest time required for the mobile robot to return to the charging station among a plurality of movement routes on which the mobile robot moves throughout the entire movement space and returns to the charging station, and based on a charging station area where the highest score is assigned among the scored areas where the charging station can be located.

Solution to Problem

A method for recommending a location of a charging station of a mobile robot according to an embodiment of the present disclosure may include generating map data of a movement space in which the mobile robot moves and location data of items located within the movement space, setting areas of the items located within the movement space based on the generated location data of the items, assigning a score to the areas of the items based on a type of the item, measuring a movement time of each of a plurality of movement routes starting from a location where a socket is present and on which the mobile robot moves while covering the movement space, assigning a score to each of the plurality of movement routes based on the measured movement time, and recommending a location of the charging station of the mobile robot based on a score assigned to an area where the socket is present and a score assigned to each of the plurality of movement routes.

That is, the charging station should be placed in an area where a socket is present. Here, in order to recommend a location of the charging station which allows the time and distance required for the mobile robot to return to the charging station to be reduced, an optimal movement route of the mobile robot may be selected among the movement routes starting from a location where a socket is present and where there is no item blocking the socket.

The method for recommending a location of a charging station of a mobile robot according to this embodiment of the present disclosure may include assigning a score to the areas of the items. When the socket is determined to be present in the areas of the items, a plus score may be assigned to the areas of the items. When the socket is determined to be absent in the areas of the items, a minus score may be assigned to the areas of the items.

When a plus score is assigned to the areas of the items, a minus score may be assigned to the areas of the items when presence of an item around the socket blocking an approach to the socket is verified.

That is, a socket is necessary in order to charge a battery of the mobile robot at the charging station. Therefore, a plus score may be assigned to an item area where the socket is present, such that the area where the socket is present may be recommended as a location of the charging station. Here, when an item (such as an electronic appliance or furniture) is blocking the socket in the area where the socket is present, it may be determined that the socket cannot be freely used even though the socket is present, and thus a minus score may be assigned.

According to the method for recommending a location of a charging station of a mobile robot according to this embodiment of the present disclosure, a location of an item obtaining the highest score among the scores assigned to the areas of the items may be recommended as a location of the charging location of the mobile robot. Here, the location of the item obtaining the highest score may be a location where the socket is present.

Further, according to the method for recommending a location of a charging station of a mobile robot according to this embodiment of the present disclosure, when measuring a movement time of each of a plurality of movement routes, data of each of the plurality of movement routes on which the mobile robot moves while covering the movement space may be collected. The collected data of each of the plurality of movement routes may refer to data on a time required for the mobile robot to start to move from a location where the socket is present and return to the socket.

When a score is assigned to each of the plurality of movement routes, the highest score may be assigned to a movement route having the shortest movement time based on the collected data of each of the plurality of movement routes. That is, the highest score may be assigned to a movement route having the shortest time required for the mobile robot to depart from the charging station and return to the charging station.

A score may be assigned to areas where several items are present in the movement space. Among the areas, the highest score may be assigned to an area where the socket is present, and the highest score may be assigned to a movement route having the shortest time required for the mobile robot to depart from the charging station and return to the charging station. A location of the charging station may thereby be recommended based on an item area obtaining the highest score and a movement route obtaining the highest score. As a result, the charging station may be located at an optimal location.

According to the method for recommending a location of a charging station of a mobile robot according to this embodiment of the present disclosure, when the map data of the movement space is generated, a map may be acquired via at least one among a distance sensor configured to sense the movement space and a collision sensor.

Similarly, according to the method for recommending a location of a charging station of a mobile robot according to this embodiment of the present disclosure, when location data of items is generated, the items may be acquired via an image sensor.

A mobile robot according to another embodiment of the present disclosure, which is capable of moving to a recommended location of a charging station, may include a body of the mobile robot, a memory configured to store map data of a movement space, an object recognizer provided in the body and configured to recognize an item located within a movement space in which the mobile robot moves, and a controller configured to recommend the charging station of the mobile robot by communicating with the memory and the object recognizer.

Here, the controller may determine whether an item recognized by the object recognizer is a socket, based on location data of items. When the item is a socket, the controller may recommend an item area where the socket is present as a location of the charging station.

That is, the controller according to this embodiment of the present disclosure may recommend an appropriate location where the charging station is to be placed, such that the mobile robot can move to the charging station at an optimal distance and in an optimal time.

The controller may store information on a plurality of movement routes starting from a location where a socket is present and on which the mobile robot moves. For example, the controller may include a movement route measuring unit configured to measure a movement time of each of the plurality of movement routes on which the mobile robot moves while covering the movement space, and a score setting unit configured to assign a score to areas of items based on a type of an item, and assign a score to each of the plurality of movement routes.

Here, a location of the charging station of the mobile robot may be recommended based on a score assigned according to a type of the item and a score assigned to each of the movement routes.

Therefore, the location of the charging station may be determined based on the scores assigned to the movement routes and the score assigned according to a type of the item, thereby allowing the mobile robot to be charged at an optimal location.

The score setting unit of the mobile robot according to this embodiment of the present disclosure may assign a plus score to the areas of the items when the socket is determined to be present in the areas of the items, and assign a minus score to the areas of the items when the socket is determined to be absent in the areas of the items.

The score setting unit of the mobile robot according to this embodiment of the present disclosure may assign the highest score to an item area where presence of the socket is verified among the areas of the items, and assign a minus score to the areas of the items when presence of an item around the socket blocking an approach to the socket is verified.

That is, a socket is necessary to charge a battery of the mobile robot at the charging station. Therefore, a plus score may be assigned to an item area where the socket is present, such that the area where the socket is present may be recommended as a location of the charging station. Here, when an item (such as an electronic appliance or furniture) is blocking the socket in the area where the socket is present, it may be determined that the socket cannot be freely used even though the socket is present, and thus a minus score may be assigned.

Further, the score setting unit of the mobile robot according to this embodiment of the present disclosure may assign the highest score to a movement route having the shortest movement time among the plurality of movement routes on which the mobile robot moves while covering the movement space. That is, the highest score may be assigned to the movement route having the shortest time required for the mobile robot to depart from the charging station and return to the charging station.

Further, the score setting unit of the mobile robot according to this embodiment of the present disclosure may further assign a plus score based on the number of electrical devices adjacent to each socket by communicating with other electrical devices located within the movement space. Here, the score setting unit may assign the highest plus score to the item area having the lowest number of the electrical devices.

As described above, a score may be assigned to areas where several items are present in a movement space. Among the areas, the highest score may be assigned to an area where a socket is present, and the highest score may be assigned to a movement route having the shortest time required for a mobile robot to depart from the charging station and return to the charging station, thereby being capable of recommending a location of the charging station based on the item area obtaining the highest score and the movement route obtaining the highest score. As a result, the charging station may be located at an optimal location.

A method for operating a mobile robot according to generating map data of a movement space in which the mobile robot is movable and location data of items located within the movement space, setting areas of the items located within the movement space based on the location data of the items, assigning a score to each of the areas of the items based on a type of an item present in a corresponding area of an item, measuring a movement time of each of a plurality of movement routes on which the mobile robot moves while covering the movement space, wherein each of the plurality of movement routes starts from a location where a socket is present among the areas of the items, assigning a score to each of the plurality of movement routes based on the measured movement time and recommending a location of a charging station based on scores assigned to areas of the item in which the socket is present and scores assigned to the plurality of movement routes.

A mobile robot according to a body, a memory configured to store map data of a movement space, a sensor provided in the body and configured to recognize an item located within the movement space in which the mobile robot is movable and a controller configured to communicate with the memory and the sensor, cause the memory to store location data of items and areas of the items, set the areas of the items located within the movement space based on the location data of the items, assign a score to each of the areas of the items based on a type of an item present in a corresponding area of an item, measure a movement time of each of a plurality of movement routes on which the mobile robot moves while covering the movement space, wherein each of the plurality of movement routes starts from a location where a socket is present among the areas of the items, assign a score to each of the plurality of movement routes based on the measured movement time and recommend a location of a charging station based on scores assigned to areas of the item in which the socket is present and scores assigned to the plurality of movement routes.

Advantageous Effects of Invention

According to embodiments of the present disclosure, an appropriate location of a charging station may be recommended, such that a mobile robot can return to the charging station in the shortest time and at the shortest distance when a remaining battery power amount is less than a reference value. As a result, it is possible for the mobile robot to move sufficiently in a movement space without running out of battery, and it is possible to enhance efficiency of the mobile robot returning to charge the battery thereof.

Further, in order to recommend a location of the charging station, a score may be assigned to areas of items within the movement space in which various items are located, and a score may be assigned to each of a plurality of movement routes on which the mobile robot moves. The highest score may be assigned to a socket area where there are no items blocking the socket, and a movement route having the shortest movement time among movement routes on which the mobile robot moves. Based on the assigned scores, it is possible to recommend an item area where the highest score is assigned as a location of the charging station. As a result, the location of the charging station may be recommended based on factors such as a movement distance and movement time of the mobile robot and characteristics of the items, rather than being arbitrarily chosen by a user. Thus, it is possible to more objectively set the location of the charging station.

Further, according to these embodiments of the present disclosure, location data of an item located within a movement space may be continually generated, and when a location of such an item is changed, an optimal location of a charging station may be re-set according to the changed location of the item. As a result, it is possible to place the charging station at an optimal location regardless of the location of the item.

DESCRIPTION OF EMBODIMENTS

Figure 1:
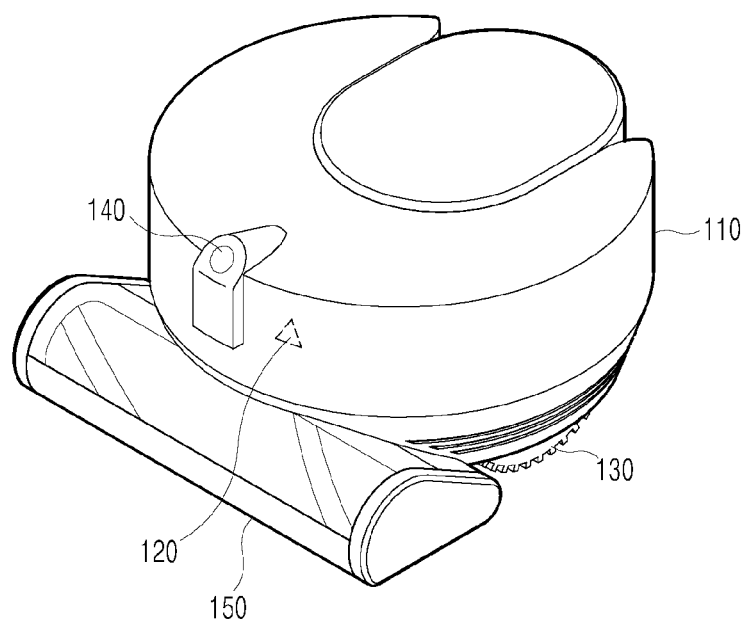
FIG. 1 is an exemplary view illustrating a mobile robot according to an embodiment of the present disclosure.

Hereinafter, the present disclosure will be described in detail with reference to the accompanying drawings. However, the present disclosure may be implemented in many different forms and should not be construed as being limited to the embodiments set forth herein. In order to clearly describe the present disclosure, parts that have no connection with the description are omitted from the embodiments. However, this does not mean that the omitted elements are unnecessary for embodying an apparatus or a system to which the idea of the present disclosure is applied. Further, like reference numerals refer to the like or similar elements throughout the specification.

Although the terms "first", "second", and the like may be used herein to describe various elements, these elements should not be limited by these terms. These terms may be only used to distinguish one element from another element. Further, as used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Hereinafter, an autonomous mobile robot capable of recommending a location of a charging station according to the present disclosure will be described in detail with reference to the accompanying drawings.

Figure 2:
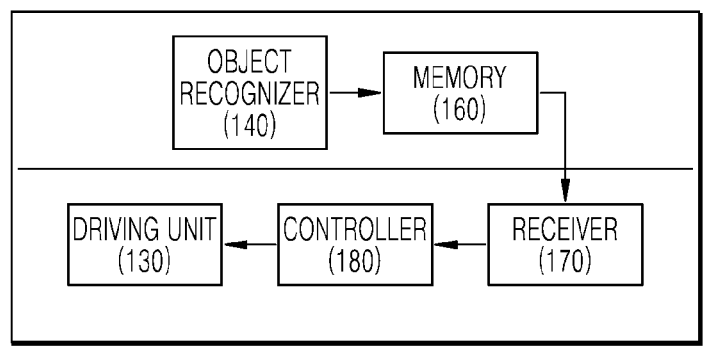
FIG. 2 is a block diagram illustrating a mobile robot according to an embodiment of the present disclosure.
Figure 3:
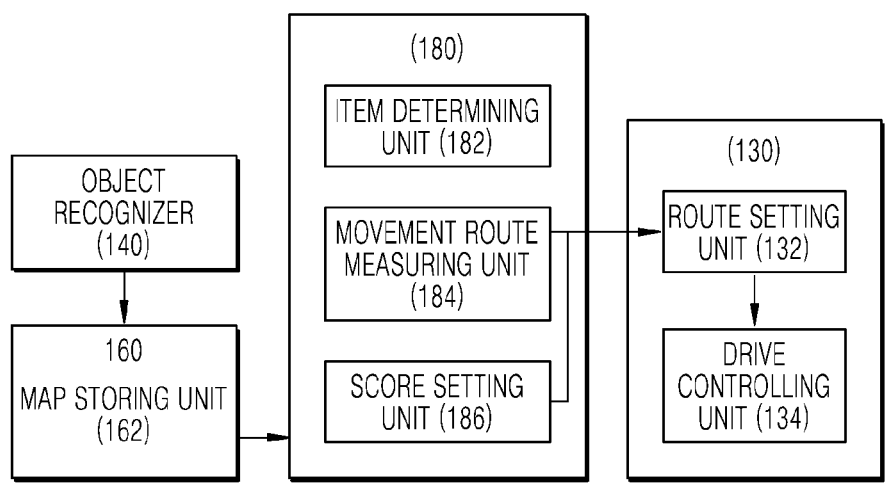
FIG. 3 is a block diagram illustrating a relationship between a memory, a controller, and a driving unit illustrated in FIG. 2.

FIG. 1 is an exemplary view illustrating a mobile robot according to an embodiment of the present disclosure, FIG. 2 is a block diagram illustrating a mobile robot according to this embodiment of the present disclosure, and FIG. 3 is a block diagram illustrating a relationship between a memory, a controller, and a driving unit illustrated in FIG. 2.

While the mobile robot according to this embodiment of the present disclosure is described for exemplary purposes as an autonomous robot cleaner, the mobile robot may also be operated in a semi-autonomous mode or a manual mode, in addition to an autonomous mode. Further, the mobile robot which is capable of performing machine learning and autonomous driving according to this embodiment of the present disclosure may refer to any robot that can be operated in autonomous mode, semi-autonomous mode, and the like, other than a robot cleaner.

A mobile robot 100 according to this embodiment of the present disclosure may move along a movement route and suck up objects (such as dust and garbage) located in front of the mobile robot 100.

The mobile robot 100 may be configured to move along the movement route, move to a charging station when a remaining battery power amount is less than a reference value, and charge the battery. Here, the charging station may be placed at an optimal location such that the mobile robot 100 moves along the movement route and returns to the charging station in the shortest time and at the shortest distance.

Specifically, the charging station may charge the battery that supplies power required to drive the mobile robot 100. That is, when the mobile robot 100 senses a remaining battery power amount during an operation (such as cleaning) and determines that the battery requires charging, the mobile robot 100 may return to the charging station using a charging station return algorithm. The charging station may be configured to supply power to the mobile robot 100 when the mobile robot 100 docks with the charging station using the charging station return algorithm, and the battery may be charged by the supplied power. After the charging is completed, the mobile robot 100 may disconnect from the charging station and resume the operation.

Generally, a user using the mobile robot 100 may initially place such a charging station at an arbitrary location where a socket is present, and the mobile robot 100 may return to the arbitrarily placed charging station regardless of an optimal movement route starting from the charging station and returning to the charging station.

In this regard, according to this embodiment of the present disclosure, an optimal movement route of the mobile robot 100 may be measured in the area where a socket is present, and the charging station may be placed at a location on the optimal movement route on which the mobile robot 100 starts to move from the charging station and returns to the charging station. As a result, when the battery of the mobile robot 100 requires charging, the mobile robot 100 can move along the movement route in the shortest time and at the shortest distance, and then charge the battery, and the charging efficiency of the mobile robot 100 is thereby enhanced.

The mobile robot 100 rechargeable at such a charging station may generate map data of a movement space (S) where the mobile robot 100 moves, in order to determine a location of the charging station.

The mobile robot 100 may include a body 110 forming an exterior of the mobile robot 100, a memory 160 configured to store the map data of a movement space (S), an object recognizer 140 provided in the body 110 and configured to recognize an item located within the movement space (S), and a controller 180 configured to recommend the charging station of the mobile robot 100 by communicating with the memory 160 and the object recognizer 140.

Here, the map data of the movement space may be pre-formed and transmitted to the mobile robot 100, or may be formed based on information acquired by the mobile robot 100 via various sensors while travelling throughout the movement space.

Specifically, the body 110 may be formed in any one of various shapes such as a circular shape and a polygonal shape, but the shape of the body 110 may vary according to conditions.

Further, a sucking unit 150 configured to suck up dust and foreign substances may be formed on the body 110. Also, the body 110 may include a sucking device (not illustrated) through which the sucking unit 150 sucks up dust and foreign substances, and a dust collector configured to collect the sucked up dust.

Further, the body 110 may include a battery (not illustrated). As described above, the battery may be configured to supply power required for the overall operation of the mobile robot 100, in addition to power required by a driving unit 130. Before such a battery is discharged, the mobile robot 100 may move to the charging station capable of charging the battery when the remaining battery power amount is less than a reference value.

Therefore, it is preferable for the mobile robot 100 to include an algorithm by which the mobile robot 100 returns to the charging station at the appropriate time and simultaneously detects, by itself, a location of the charging station during the return.

Meanwhile, the body 110 may include the object recognizer 140 configured to photograph the items ($I_1$, $I_2$, $I_3$ and $I_4$) (see FIG. 5) located within the movement space (S) as, for example, a video or an image. The object recognizer 140 may refer, for example, to an image sensor or a camera, and the data of a video or an image photographed by the object recognizer 140 may be stored in the memory 160.

Furthermore, the body 110 may include the object recognizer 140 configured to measure, for example, the locations of various items located within the movement space (S) to generate the map data of the movement space (S), and a spatial shape of the movement space (S), in order to determine a location of the charging station.

The object recognizer 140 may refer to any one among a distance sensor and a collision sensor, and may generate data on the distance between the body 110 and the item, or data on the arrangement of various items located within the movement space (S) through a collision between the body 110 and the item, or data on the arrangement of obstacles such as pillars within the movement space (S).

Further, the body 110 may include the driving unit 130 configured to cause the body 110 to move. The driving unit 130 may include at least one drive wheel configured to cause the body 110 to rotate and move. The drive wheel may be arranged on one surface of the body 110, but a structure of installing the drive wheel may vary according to conditions. Meanwhile, the body 110 or the driving unit 130 may include a separate drive motor capable of driving the drive wheel.

As described above, the mobile robot 100 driven by the driving unit 130 may generate the map data of the movement space (S), and the generated map data may be stored in the memory 160. Further, the memory 160 storing the map data may store location data of the items based on the image and video data of the items located within the movement space (S) recognized by the object recognizer 140, and data of the areas where the respective items are located.

Meanwhile, the controller 180 may determine whether an item recognized by the object recognizer 140 is a socket based on the location data of the items according to a type of an item located within the movement space (S), and recommend an area where the socket is present as a location of the charging station when the item recognized by the object recognizer 140 is recognized to be a socket.

Specifically, the object recognizer 140 may generate data of various items located within the movement space (S), data of the areas where the respective items are located, and the map data of the movement space (S).

The generated data may be stored in the memory 160, and the data stored in the memory 160 may be transmitted to a receiver 170. The item data and the map data transmitted to the receiver 170 may be used by the controller 180 as data for extracting a location of the charging station.

Specifically, in order to extract the location of the charging station, a type of an item may be determined based on the data of the items among the data stored in the memory 160. To this end, the controller 180 may include an item determining unit 182.

In particular, the item determining unit 182 may determine a socket among the data of the items stored in the memory 160, since the socket may be connected to the charging station and supply the power to the charging station.

Further, in order to place the charging station at an appropriate location, it is preferable that a distance of the movement route of the mobile robot 100 is reduced as much as possible. Specifically, as the movement distance required for the mobile robot 100 to start to move from the charging station and return to the charging station is shortened, the charging efficiency of the mobile robot 100 is enhanced.

To this end, the controller 180 may include a movement route measuring unit 184 configured to measure the movement route of the mobile robot 100. The movement route measuring unit 184 may refer to a movement route starting from a location where the socket connected to the charging station is present, and may be configured to measure the movement time of each of a plurality of movement routes on which the mobile robot 100 moves while covering the movement space (S).

For example, when the mobile robot 100 is initially disposed in the movement space (S), a user may place the charging station at an arbitrary location where the socket is present. The charging station having been arbitrarily placed, the mobile robot 100 may move while covering the movement space (S). Such a movement route may be referred to as an initial movement route.

Thereafter, the mobile robot 100 which starts to move from the charging station where the socket is present may cover the movement space (S) using various movement routes in order to extract the optimal movement route, and the movement time spent in each of the movement routes may be measured.

Here, the movement time may be measured using any one among a method of measuring the movement time of the mobile robot 100 by variously changing the movement routes on which the mobile robot 100 starts to move from an initial location of the charging station and returns to the charging station, and a method of measuring the movement time of the mobile robot 100 by placing the charging station at different locations and measuring each of the movement times of returning to the charging station.

Further, the mobile robot 100 may virtually calculate possible movement routes starting from each of the respective sockets based on the location of the sockets determined by the object recognizer 140, and then anticipate the movement time according to the movement routes.

A score may be assigned to the movement routes measured or anticipated by the movement route measuring unit 184. For example, a highest score may be assigned to the movement route having the shortest time required for the mobile robot 100 to depart from the charging station and return to the charging station, among the movement routes measured or anticipated by the movement route measuring unit 184.

To this end, the controller 180 may include a score setting unit 186 configured to assign a score to the movement routes.

In order to place the charging station at an appropriate location, it is preferable that the socket is disposed to be adjacent to the charging station. Accordingly, the score setting unit 186 may assign a score to the areas of the items within the movement space (S) where the items are located.

Here, the score setting unit 186 may assign a plus score to the item areas where the socket is present when the socket is determined to be present in the item areas, and assign a minus score to the areas where the socket is absent (for example, an area where furniture or an electronic appliance is disposed) when the socket is determined to be absent in the item areas.

In particular, the score setting unit 186 may assign the highest score to the area where the socket is present. However, when the presence of an item (such as furniture, a box, or an electronic appliance) around the socket blocking the socket is verified, it may be determined that the socket cannot be freely used even though the socket is present, and thus the score setting unit 186 may assign a minus score to the verified area.

Conversely, when an item recognized by the object recognizer 140 is not the socket, but an item (such as a leg of a piece of furniture) that does not block the socket, it may be determined that the socket can be used since the socket is not blocked, and thus the score setting unit 186 may assign a plus score to the verified area.

Meanwhile, a mobile robot according to the environment where the present disclosure is used may be connected with other electrical devices within a movement space in a 5G communication environment. In this case, a score setting unit of the mobile robot according to this embodiment of the present disclosure may count the number of electrical devices adjacent to each socket by communicating with other electrical devices. As the number of the electrical devices adjacent to the socket is greater, it may become more difficult to place the charging station. Therefore, when the score setting unit assigns a plus score, the score setting unit may assign the highest plus score to the item area having the lowest number of the electrical devices.

The area of the item located in the movement route for which the highest score is assigned by the score setting unit 186 may be recommended as a location where the charging station is to be placed. The recommended location may be displayed, for example, on a terminal of the user, a wearable device, and a display which is included in the mobile robot 100 and capable of illustrating a map of the movement space (S).

After the location where the charging station is to be placed is extracted and recommended, the relevant data may be transmitted to the driving unit 130, the driving unit 130 may be driven based on the transmitted data, and then the mobile robot 100 of which the battery requires charging may move to the charging station. Further, the user may re-place the charging station at the recommended location according to the movement location of the mobile robot or the recommended location transmitted to a user terminal.

Here, when an initial location of the charging station is changed, the route of the mobile robot 100 may be re-set from the initial location of the charging station. Therefore, the driving unit 130 may include a route setting unit 132 configured to set a route of the mobile robot 100, and a drive controlling unit 180 configured to cause the mobile robot 100 of which the route has been changed by the route setting unit 132 to move.

Through the configurations of the mobile robot 100 described above, a charging station may be placed at a location at which the time and distance required for the mobile robot 100 capable of performing cleaning to move along the movement route and return to the charging station when a remaining battery power amount is less than a reference value are reduced. As a result, the driving efficiency of the mobile robot 100 for charging the battery can be enhanced.

A process of recommending a location of a charging station, in which the time and distance required for the mobile robot 100 to return to the charging station for charging the battery of the mobile robot 100 are reduced, will be described below in detail with reference to FIG. 4.

Figure 4:
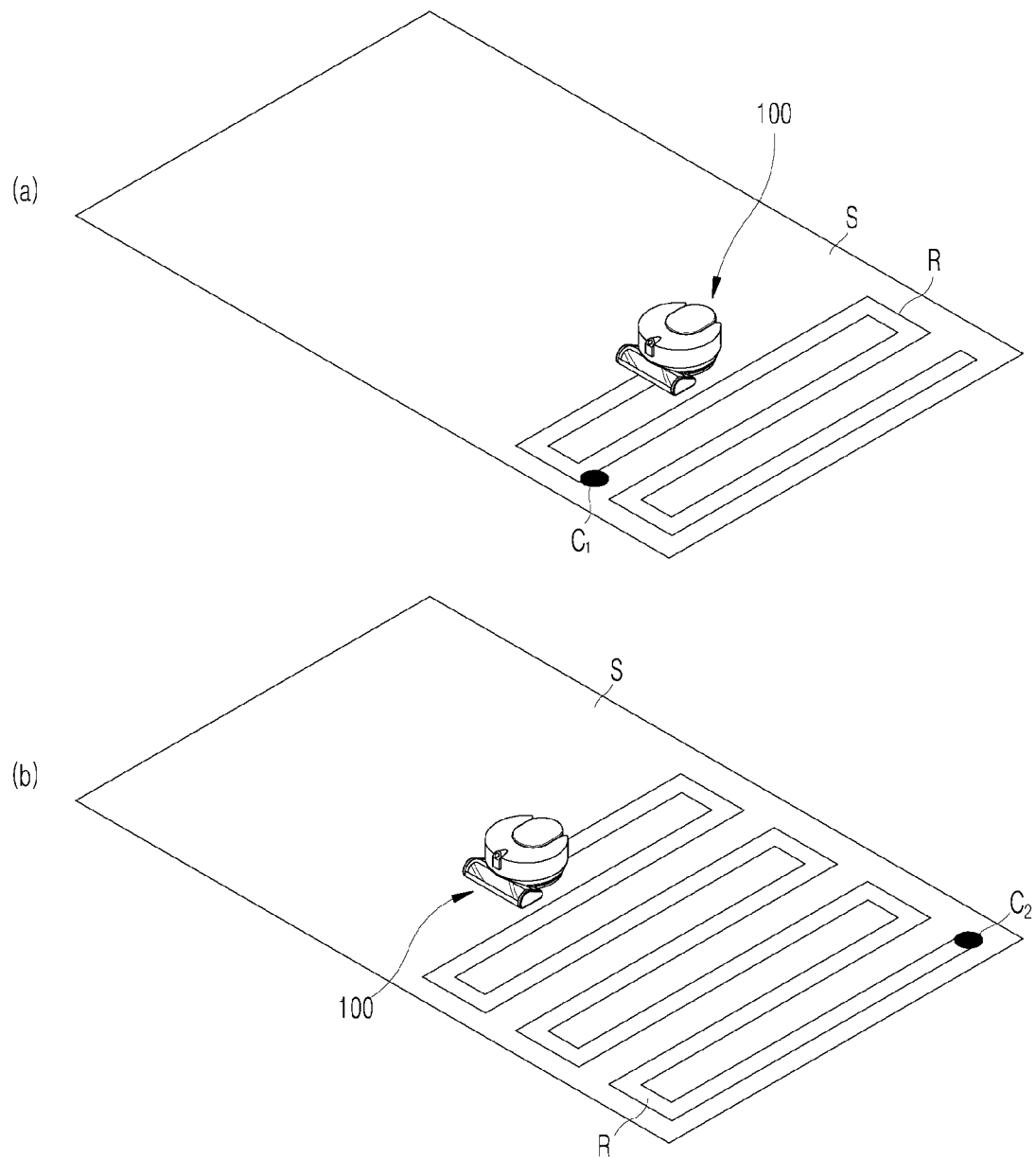
FIG. 4 is an exemplary view illustrating a change of a location recommended with respect to a charging station of a mobile robot according to a movement route of a mobile robot illustrated in FIG. 1, (a) illustrating an initial location of a charging station, and (b) illustrating a location of a charging station changed due to a recommendation.

FIG. 4 is an exemplary view illustrating a change of a location recommended with respect to a charging station of a mobile robot according to a movement route illustrated in FIG. 1.

Referring to FIG. 4, the mobile robot 100 may include a memory 160 storing map data of a movement space (S) in which the mobile robot 100 moves. The map data may refer to data recognized by the object recognizer 140 during the movement of the mobile robot 100.

The map data of the movement space (S) having been stored, the mobile robot 100 may be set to move while covering the movement space (S) from an initial location of a charging station ($C_1$) which charges the battery of the mobile robot 100, and return to the charging station when a remaining battery power amount is less than a reference value (see FIG. 4(*a*)).

Thereafter, the mobile robot 100 may recommend, as a location of the charging station, a location having the shortest time and the shortest distance required to return to the charging station among the various movement routes (R) on which the mobile robot 100 moves while covering the movement space (S) (see $C_2$ in FIG. 4(*b*)).

Here, in order to recommend the location of the charging station, a score may be assigned to the plurality of movement routes on which the mobile robot 100 moves, and a movement route (R) where the highest score is assigned may be recommended as a location of the charging station.

Specifically, the mobile robot 100 may move by using various routes starting from the initial location of the charging station ($C_1$) and returning to the initial location of the charging station ($C_1$). Here, a score setting unit (reference numeral 186 in FIG. 3) may assign a score to each of the movement routes, and the highest score may be assigned to the movement route having the shortest time required for the mobile robot 100 to return to the initial location of the charging station ($C_1$), among the movement routes where the scores are assigned. That is, the movement route obtaining the highest score may be determined as the optimal movement route by which the mobile robot 100 returns to the charging station, and thus the movement route for which the highest score is assigned may be recommended as a location of the charging station.

Here, this embodiment of the present disclosure exemplifies various movement routes of the mobile robot 100 starting from the initial location of the charging station ($C_1$) and returning to the initial location of the charging station ($C_1$). However, the location of the charging station may also be changed according to each of the various movement routes of the mobile robot 100, and by assigning a score to each of the movement routes according to the location of the charging station, the movement route for which the highest score is assigned may be recommended as a location of the charging station.

Meanwhile, the location of the charging station changed by recommendation may be determined based on a type of an item located within the movement space (S). Hereinafter, an example of recommending a location of the charging station based on a type of the item will be described with reference to FIG. 5.

Figure 5:
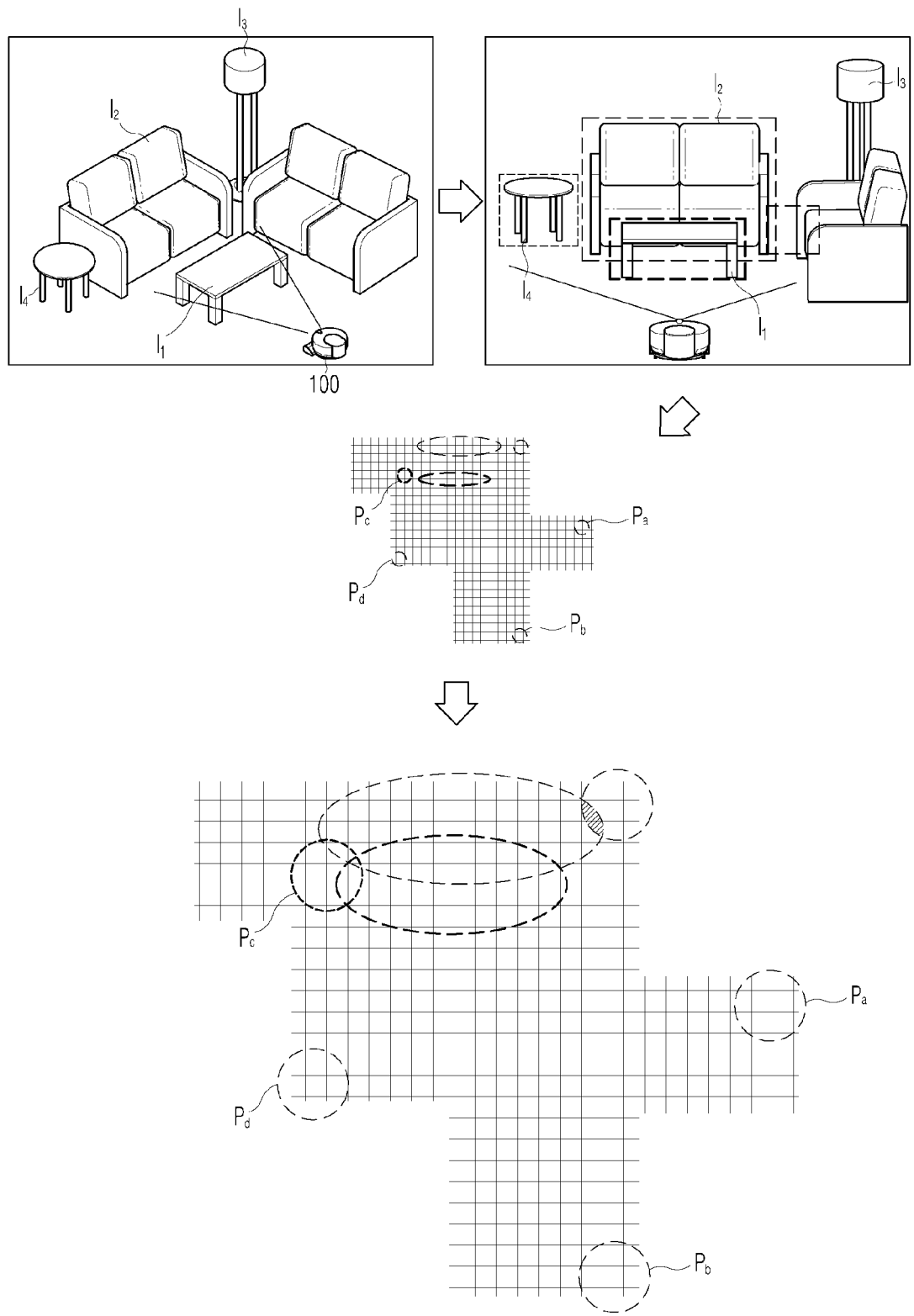
FIG. 5 is an exemplary view illustrating assigning a score to areas of items according to an embodiment of the present disclosure.
Figure 6:
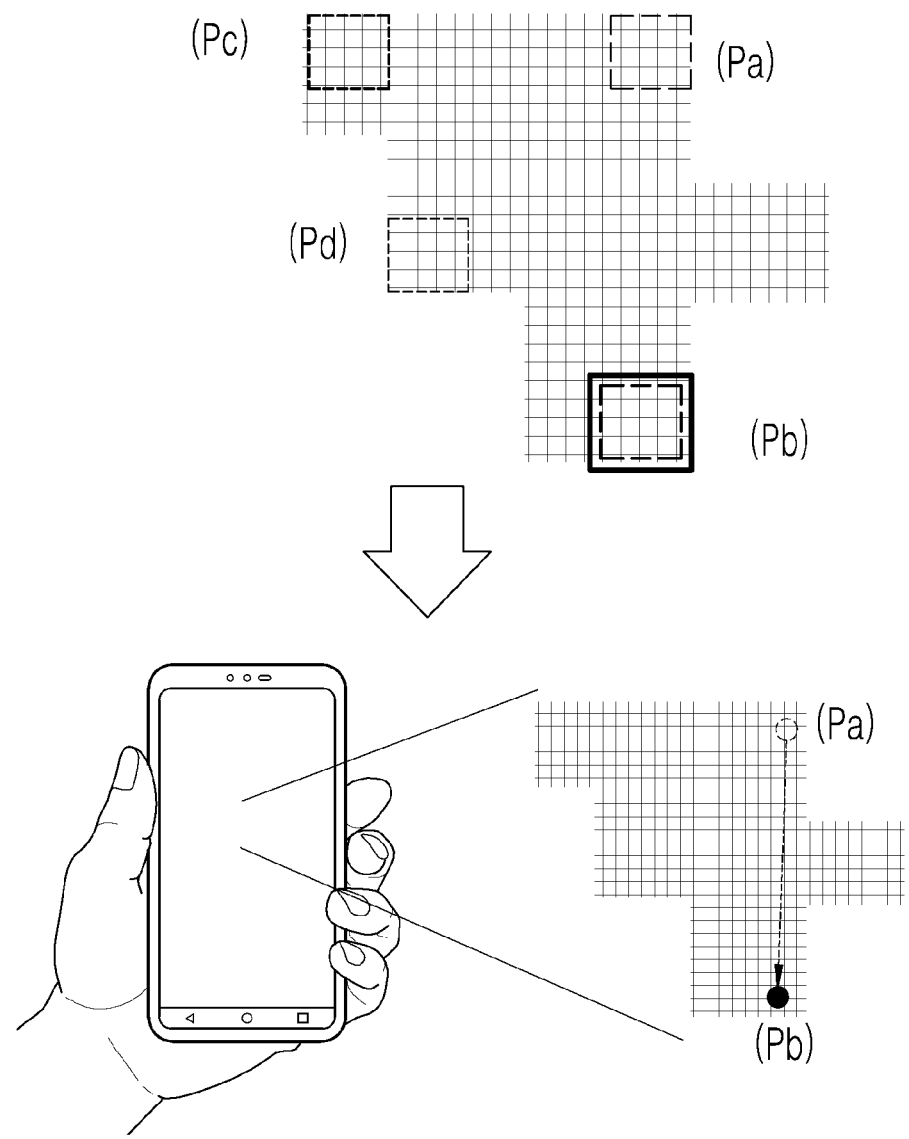
FIG. 6 is an exemplary view illustrating a recommendation of a location of a charging station based on a score assigned to areas of items, according to an embodiment of the present disclosure.

FIG. 5 is an exemplary view illustrating assigning a score to areas of the items according to an embodiment of the present disclosure, and FIG. 6 is an exemplary view illustrating a recommendation of a location of a charging station based on a score assigned to areas of the items according to an embodiment of the present disclosure.

In order to assign a score to the item areas, an object recognizer 140 may recognize various items ($I_1$, $I_2$, $I_3$, and $I_4$) located within a movement space (S), and recognize the item areas where the respective items ($I_1$, $I_2$, $I_3$, and $I_4$) are located. Similarly, the object recognizer 140 may recognize the item areas ($P_a$, $P_b$, $P_c$, and $P_d$) where a socket is present.

When the object recognizer 140 determines the item areas, presence of the socket in the determined item areas may be verified. The presence of the socket may be verified by using a method of sensing, for example, a wavelength and a voltage generated in the socket. To this end, the mobile robot 100 may include a sensor (not illustrated) configured to sense, for example, a wavelength and a voltage generated in the socket. In addition, the presence of the socket may be verified by identifying a shape of the socket via an image sensor of the object recognizer 140.

When the presence of the socket is verified in the item areas, a plus score may be assigned to the item areas ($P_a$, $P_b$, $P_c$, and $P_d$) where the presence of the socket is verified. Conversely, when the presence of the socket is not verified in the item areas, a minus score may be assigned to the item areas ($I_1$, $I_2$, $I_3$, and $I_4$). Here, the plus score and the minus score may vary according to conditions.

Through the determination of whether the socket is present in the item areas, a score may be assigned to the item areas in which the socket has been determined to be present. Consequently, the socket may be determined to be present in the item area obtaining a (+) score, and as a result, an area where the charging station requiring the socket is to be placed may be extracted. Here, the extracted area may be displayed, for example, on a display formed on the mobile robot 100 and a mobile terminal of the user, so that the user can more easily verify a location of the charging station.

Here, when the presence of an item around the socket blocking an approach to the socket (for example, covering the socket, or when there is no available socket) is verified, a minus score may be assigned to the verified item area.

Specifically, when the socket is blocked by furniture or other objects in the item area for which the presence of the socket is verified based on the map data, or when an electronic device other than the charging station is connected to the socket, the socket may not be available, and thus the charging station may not be placed in such an item area. Thus, recommending such an item area as a location of the charging station may be prevented by assigning a minus score to such an item area.

A score may be assigned to the item areas and the movement routes on which the mobile robot 100 moves, and a location of the charging station may be extracted based on the item area and the movement route which respectively obtain the highest score.

Here, when the extracted location of the charging station is a location ($P_b$) (see FIG. 6) to be changed from an initial location ($P_a$) (see FIG. 6) of the charging station, the relevant data may be displayed, for example, on a terminal of the user, a wearable device capable of communicating with the mobile robot 100, and a display installed in the mobile robot 100. Hereinafter, an embodiment of the present disclosure will be described with an example of providing, to a terminal of a user, a recommendation that a location ($P_b$) to be changed is more appropriate than an initial location ($P_a$) of the charging station.

Hereinafter, the order of recommending a location of a charging station which charges a battery of the mobile robot 100 will be described with reference to FIGS. 7 to 9.

Figure 7:
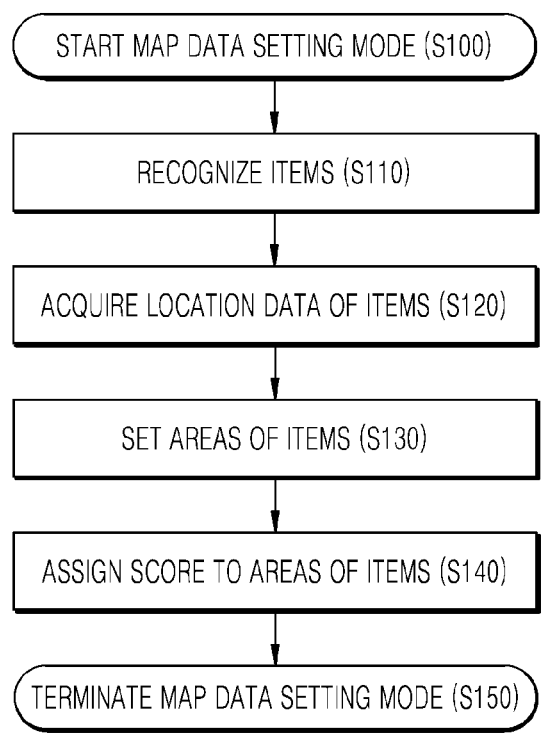
FIG. 7 is a flowchart illustrating a process of setting map data of a movement space in which a mobile robot moves, and assigning a score based on a type of an item located within a movement space, according to an embodiment of the present disclosure.
Figure 8:
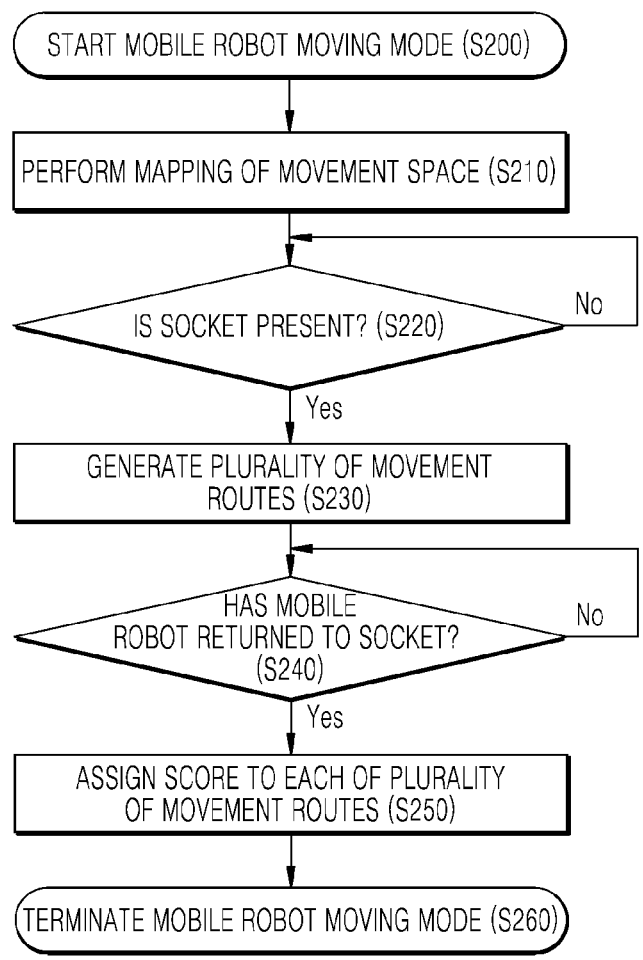
FIG. 8 is a flowchart illustrating a process of assigning a score to a plurality of movement routes on which a mobile robot moves in a state in which map data illustrated in FIG. 7 has been set.
Figure 9:
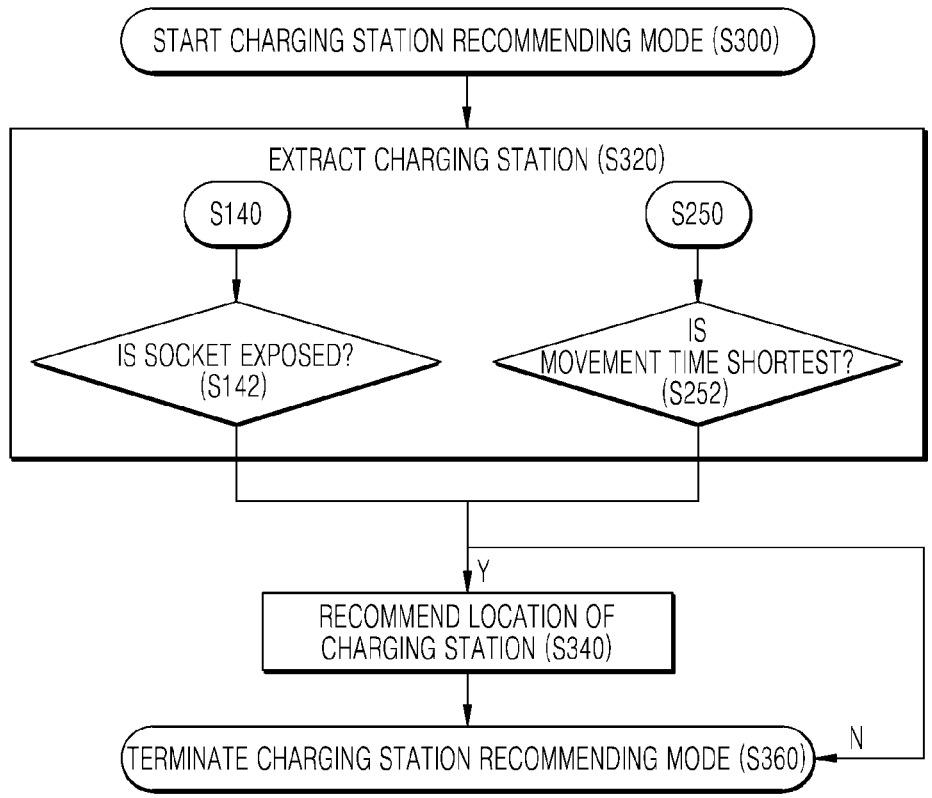
FIG. 9 is a flowchart illustrating a process of recommending a location of a charging station based on a score assigned according to a type of an item and a score assigned according to a movement route of a mobile robot illustrated in FIGS. 7 and 8.

FIG. 7 is a flowchart illustrating a process of setting map data of a movement space in which a mobile robot moves and a process of assigning a score according to a type of an item located within the movement space according to an embodiment of the present disclosure. FIG. 8 is a flowchart illustrating a process of assigning a score to a plurality of movement routes on which a mobile robot moves in a state in which map data illustrated in FIG. 7 has been set. FIG. 9 is a flowchart illustrating a process of recommending a location of a charging station based on a score assigned according to a type of an item and a score assigned according to a movement route of a mobile robot illustrated in FIGS. 7 and 8.

Where the reference numerals illustrated in FIGS. 7 to 9 are the same as those illustrated in FIGS. 1 to 6, they are deemed to refer to the same element, and thus, detailed explanation thereof is omitted.

A mobile robot 100 according to another embodiment of the present disclosure relates to an apparatus which moves along a movement route and autonomously sucks up objects such as dust and garbage located around the mobile robot 100.

The mobile robot 100 may be configured to move along the movement route, move to a charging station when a remaining battery power amount is less than a reference value, and charge the battery. Here, the charging station may be placed at an optimal location such that the mobile robot 100 moves along the movement route and returns to the charging station in the shortest time and at the shortest distance.

Specifically, the charging station may charge the battery that supplies power required to drive the mobile robot 100. That is, when the mobile robot 100 senses a remaining battery power amount during the operation (such as cleaning) and determines that the battery requires charging, the mobile robot 100 may return to the charging station using a charging station return algorithm.

In order to place such a charging station, it is preferable that a distance (returning distance) required for the mobile robot 100 to move to the charging station, and the movement time, are reduced as much as possible. Therefore, map data of a movement space (S) where the mobile robot 100 moves may be set (S100).

Referring to FIG. 7, map data of the movement space and location data of the items such located within the movement space (S) may be generated (S110 and S120). Concisely, a mobile robot 100 may acquire the data of various items ($I_1$, $I_2$, $I_3$, and $I_4$) located within the movement space (S) and the data of the item areas ($P_a$, $P_b$, $P_c$, and $P_d$) where a socket is present.

When the map data is generated, the map may be acquired via any one among a distance sensor, which is a sensor 120 sensing the movement space (S), and a collision sensor. Concisely, various types of data may be generated, examples of which include data on the distance between the body 110 and the item, or data on the arrangement of various items located within the movement space (S) acquired via a collision between the body 110 and the item or data on the arrangement of obstacles such as pillars within the movement space (S).

Thereafter, the areas where the items ($I_1$, $I_2$, $I_3$, and $I_4$) are located, and the item areas ($P_a$, $P_b$, $P_c$, and $P_d$) where the socket is present may be set (S130). The item areas may be set based on, for example, a size of an item and a width of an item. Further, the presence of the socket may be verified by using a method of sensing, for example, a wavelength and a voltage generated in the socket. In addition, the presence of the socket may be verified by identifying a shape of the socket via an image sensor of an object recognizer 140.

When the location data of the items is generated, the item may be acquired by, for example, an image sensor or a camera provided in the mobile robot 100, and the data of photographed video or image may be stored in a memory 160.

Thereafter, a score may be assigned to the item areas (S140). For example, a plus score may be assigned to the items areas ($P_a$, $P_b$, $P_c$, and $P_d$) where the presence of the socket is verified. Conversely, when the presence of the socket is not verified in the item areas, a minus score may be assigned to the item areas ($I_1$, $I_2$, $I_3$, and $I_4$). Here, the plus score and the minus score may vary according to conditions.

Through the determination of whether the socket is present in the item areas, a score may be assigned to the item areas in which the socket has been determined to be present. Consequently, the socket may be determined to be present in the item area obtaining a (+) score, and as a result, an area where the charging station requiring the socket is to be placed may be extracted.

Here, when the presence of an item around the socket blocking an approach to the socket (for example, covering the socket, or when there is no available socket) is verified, a minus score may be assigned to the verified item area.

Specifically, when the socket is blocked by furniture or other objects in the item area for which the presence of the socket is verified based on the map data, or when an electronic device other than the charging station is connected to the socket, the socket may not be available, and thus the charging station may not be placed in such an item area. Thus, recommending such an item area as a location of the charging station may be prevented by assigning a minus score to such an item area.

A score may be assigned to the item areas, and the item area obtaining the highest score may be recommended as a location of the charging station.

Meanwhile, when the recommended location of the charging station is a location ($P_b$) (see FIG. 6) to be changed from an initial location ($P_a$) (see FIG. 6) of the charging station, the relevant data may be displayed, for example, on a terminal of the user, a wearable device capable of communicating with the mobile robot 100, and a display installed in the mobile robot 100. Hereinafter, an embodiment of the present disclosure will be described with an example of providing, to a terminal of a user, a recommendation that a location ($P_b$) to be changed is more appropriate than an initial location ($P_a$) of the charging station.

When a score is assigned to the item areas using such a method, the map data setting mode of the movement space (S) may be terminated (S150).

Hereinafter, a process of recommending an optimal movement route as a location of a charging station among various movement routes on which a mobile robot 100 moves, in a state in which the map data of a movement space (S) has been acquired, will be described with reference to FIG. 8 (S200).

Referring to FIG. 8, a mobile robot 100 may acquire and learn the data of various items ($I_1$, $I_2$, $I_3$, and $I_4$) located within a movement space (S) and the data of the item areas ($P_a$, $P_b$, $P_c$, and $P_d$) where the socket is present, and perform mapping of the movement space (for example, a space available for cleaning) that can generate the movement route.

In this embodiment of the present disclosure, the mobile robot 100 is described as a robot cleaner and the movement route is described as a movement space, for exemplary purposes. However, when the mobile robot 100 refers to an autonomous robot other than a robot cleaner, a movement route may refer to any one space among spaces where autonomous driving is available, and the mobile robot 100 may perform a mapping of the space where autonomous driving is available.

In a state in which mapping of the movement space (S) has been performed, the mobile robot 100 may be set to move while covering the movement space (S) from an initial location of the charging station ($C_1$) (see FIG. 4), and return to the initial location of the charging station ($C_1$) when a remaining battery power amount is less than a reference value.

Thereafter, a location having the shortest time and the shortest distance required for the mobile robot 100 to return to the charging station among various movement routes on which the mobile robot 100 moves while covering the movement space (S) may be recommended as a location of the charging station.

In order to recommend a location of the charging station, a score may be assigned to the plurality of movement routes on which the mobile robot 100 moves, and a movement route for which the highest score is assigned may be recommended as a location of the charging station.

Specifically, the mobile robot 100 may move by using various routes returning to an initial location of the charging station ($C_1$). Here, a score may be assigned to each of various movement routes, and the highest score may be assigned to a movement route having the shortest time required for the mobile robot 100 to return to the initial location of the charging station ($C_1$) among the movement routes where the scores are assigned.

Here, this embodiment of the present disclosure exemplifies the various movement routes of the mobile robot 100 starting from the initial location of the charging station ($C_1$) and returning to the initial location of the charging station ($C_1$). However, the location of the charging station may also be changed according to each of the various movement routes of the mobile robot 100, and by assigning a score to each of the movement routes according to the location of the charging station, the movement route for which the highest score is assigned may be recommended as the location of the charging station.

Meanwhile, in order to recommend the movement route as a location where the charging station is to be located, while the mobile robot 100 moves along the movement route, the mobile robot 100 may determine whether a socket is present in the movement route (S220).

The socket may be configured to supply power to a charging station, and may therefore be a condition for the possibility of placing the charging station. A movement route where the presence of a socket is verified while the mobile robot 100 moves along the movement route may be generated as one of the plurality of movement routes (S230). When the presence of the socket is not verified, the mobile robot 100 may move again so as to generate a movement route where the socket is present.

When the plurality of movement routes has been generated, it may be determined whether the mobile robot 100 has returned to the socket (S240). When the movement routes on which the mobile robot 100 returns to the socket have been generated, a score may be assigned to each of the generated movement routes (S250).

When a score has been assigned to each of the movement routes, for example, the highest score may be assigned to the movement route having the shortest time required for the mobile robot 100 to return to an initial location of the charging station ($C_1$). That is, the movement route obtaining the highest score may be determined as the optimal movement route by which the mobile robot 100 returns to the charging station, and thus the movement route for which the highest score is assigned may be recommended as a location of the charging station.

Meanwhile, this embodiment of the present disclosure exemplifies the various movement routes of the mobile robot 100 starting from the initial location of the charging station ($C_1$) and returning to the initial location of the charging station ($C_1$). However, the location of the charging station may also be changed according to each of the various movement routes of the mobile robot 100, and by assigning a score to each of the movement routes according to the location of the charging station, the movement route for which the highest score is assigned may be recommended as the location of the charging station.

When a score is assigned to the movement route on which the mobile robot moves, a moving mode of the mobile robot may be terminated (S260).

Thereafter, a charging station may be recommended to be located at the optimal location based on the score assigned to the areas of the items located within the movement space, and the score assigned to the movement routes.

Specifically, when a score is assigned to the item areas (S140) (see FIG. 7), the presence of the item blocking a socket may be verified (S142). That is, a socket is necessary to charge a battery of the mobile robot at the charging station. Therefore, a plus score may be assigned to the item area where the socket is present, such that the area where the socket is present may be recommended as a location of the charging station. Here, when an item (such as an electronic appliance or furniture) is blocking the socket in the area where the socket is present, it may be determined that the socket cannot be freely used even though the socket is present, and thus a minus score may be assigned, and such an area may not be recommended as a location of the charging station.

Further, when a score is assigned to the movement routes on which the mobile robot 100 moves (S250), the highest score may be assigned to a movement route having the shortest movement time (S252). That is, the highest score may be assigned to the movement route having the shortest time required for the mobile robot 100 to depart from the charging station and return to the charging station.

Therefore, a score may be assigned to the areas where several items are present in the movement space, the highest score may be assigned to the area where the socket is present, and the highest score may be assigned to the movement route having the shortest time required for the mobile robot 100 to depart from the charging station and return to the charging station, thereby recommending the location of the charging station based on the item area obtaining the highest score and the movement route obtaining the highest score (S340). As a result, the charging station recommending mode may be terminated (S360).

Thus, an appropriate location of a charging station may be recommended, such that the mobile robot can return to the charging station in the shortest time and at the shortest distance when the remaining battery power amount is less than a reference value.

Further, a score may be assigned to the areas of the items located within the movement space in which various items are located, and a score may be assigned to each of the plurality of movement routes on which the mobile robot moves. The highest score may be assigned to a socket area where there is no item blocking the socket, and a movement route having the shortest movement time among the movement routes on which the mobile robot moves. Based on the assigned scores, it is possible to recommend the item area where the highest score is assigned as a location of the charging station. As a result, the location of the charging station may be recommended based on factors such as a movement distance and movement time of the mobile robot and characteristics of the items, rather than being arbitrarily chosen by a user. Thus, it is possible to more objectively set the location of the charging station.

Further, the data of the location of the items and the data of the item areas may be continually acquired while the mobile robot 100 moves in the movement space. Here, when the location of the items and the item areas are changed, an optimal location of the charging station may be re-set by assigning a score to the item areas and re-setting a movement route of the mobile robot.

Although all of the elements constituting the embodiments of the present disclosure are described as being integrated into a single one or being operated as a single one, the present disclosure is not necessarily limited to such embodiments. That is, all the elements may be selectively integrated into one or more and be operated as one or more within the scope of the present disclosure. Further, each of the elements may be implemented as independent hardware. Alternatively, some or all of the elements may be selectively combined to be implemented as a computer program having a program module performing some or all functions combined in one or more pieces of hardware. Codes and code segments constituting the computer program may be easily inferred by those skilled in the art to which the present disclosure belongs. The computer program is stored in computer readable media such that the computer program is read and executed by a computer to implement embodiments of the present disclosure. Examples of the storage media of the computer program may include magnetic recording media, optical recording media, and a semiconductor storage device. Further, the computer program implementing the embodiments of the present disclosure may include a program module transmitted in real-time via an external device.

The present disclosure described as above is not limited by the embodiments described herein. It should be apparent to those skilled in the art that various changes and modifications which are not exemplified herein but are still within the idea and scope of the present disclosure may be made. Therefore, the scope of the present disclosure is not construed by the embodiments described herein, and should be construed by the technical idea within the claims.

While the foregoing has been given by way of embodiments of the present disclosure, all such and other modifications and variations thereto as would be apparent to those skilled in the art are deemed to fall within the broad scope and ambit of this disclosure as is set forth herein.

The invention claimed is:

1. A method for operating a mobile robot, the method comprising:
   generating map data of a movement space in which the mobile robot is movable and location data of items located within the movement space;
   setting areas of the items located within the movement space based on the location data of the items;
   assigning a score to each of the areas of the items based on a type of an item present in a corresponding area of an item;
   measuring a movement time of each of a plurality of movement routes on which the mobile robot moves while covering the movement space, wherein each of the plurality of movement routes starts from a location where a socket is present among the areas of the items;
   assigning a score to each of the plurality of movement routes based on the measured movement time; and
   recommending a location of a charging station based on scores assigned to areas of the item in which the socket is present and scores assigned to the plurality of movement routes.

2. The method according to claim 1, wherein the assigning the score to each of the areas of the items comprises:
   assigning a plus score to an area of an item in which the socket is present among the areas of the items; and
   assigning a minus score to an area of an item in which the socket is absent among the areas of the items.

3. The method according to claim 2, wherein the assigning the score to each of the areas of the items further comprises:
   assigning a minus score to an area of an item in which the socket is present when the area of the item includes an item blocking an approach to the socket.

4. The method according to claim 1, wherein the recommending the location of the charging station comprises recommending an area of an item to which a highest score is assigned as the location of the charging station.

5. The method according to claim 1, wherein:
   the measuring the movement time of each of the plurality of movement routes comprises collecting data of each of the plurality of movement routes on which the mobile robot moves while covering the movement space; and
   the collected data comprise data on a time required for the mobile robot to start to move from a location where the socket is present, cover an entire area of the movement space, and then return to the socket.

6. The method according to claim 5, wherein a highest score is assigned to a movement route having a shortest movement time among the plurality of movement routes based on the collected data.

7. The method according to claim 1, wherein the map data of the movement space is generated by acquiring a map via at least one of a distance sensor configured to sense the movement space or a collision sensor configured to detect collision of the mobile robot and an item in the movement space.

8. The method according to claim 1, wherein the location data of the items is generated by acquiring information about the items via an image sensor.

9. The method according to claim 1, further comprising causing the mobile robot to move to the recommended location of the charging station.

10. A mobile robot comprising:
    a body;
    a memory configured to store map data of a movement space;
    a sensor provided in the body and configured to recognize an item located within the movement space in which the mobile robot is movable; and
    a controller configured to:
      communicate with the memory and the sensor;
      cause the memory to store location data of items and areas of the items;
      set the areas of the items located within the movement space based on the location data of the items;
      assign a score to each of the areas of the items based on a type of an item present in a corresponding area of an item;
      measure a movement time of each of a plurality of movement routes on which the mobile robot moves while covering the movement space, wherein each of the plurality of movement routes starts from a location where a socket is present among the areas of the items;
      assign a score to each of the plurality of movement routes based on the measured movement time; and
      recommend a location of a charging station based on scores assigned to areas of the item in which the socket is present and scores assigned to the plurality of movement routes.

11. The mobile robot according to claim 10, wherein the controller is further configured to:

assign a plus score to an area of an item in which the socket is present among the areas of the items; and assign a minus score to an area of an item in which the socket is absent among the areas of the items.

12. The mobile robot according to claim 11, wherein the controller is further configured to assign a minus score to an area of an item in which the socket is present when the area of the item includes an item blocking an approach to the socket.

13. The mobile robot according to claim 12, wherein the controller is further configured to:

assign a plus score based on a number of electrical devices adjacent to each socket by communicating with other electrical devices located within the movement space; and assign a highest plus score to an area of an item having a lowest number of electrical devices among the areas of the items.

14. The mobile robot according to claim 10, wherein:

the controller is further configured to collect data of each of the plurality of movement routes on which the mobile robot moves while covering the movement space; and the collected data comprise data on a time required for the mobile robot to start to move from a location where the socket is present, cover an entire area of the movement space, and then return to the socket.

15. The mobile robot according to claim 14, wherein the controller is further configured to assign a highest score to a movement route having a shortest movement time among the plurality of movement routes based on the collected data.

16. The mobile robot according to claim 10, wherein the sensor comprises:

a distance sensor configured to sense the movement space; and a collision sensor configured to detect collision of the mobile robot and an item in the movement space, and wherein the map data of the movement space is generated by acquiring a map via at least one of the distance sensor or the collision sensor.

17. The mobile robot according to claim 10, wherein:

the sensor comprises an image sensor; and the location data of the items is generated by acquiring information about the items via the image sensor.

18. The mobile robot according to claim 10, wherein the controller is further configured to cause the mobile robot to move to the recommended location of the charging station.

19. The mobile robot according to claim 18, wherein the controller is further configured to cause the charging station to charge a battery of the mobile robot.

20. The mobile robot according to claim 19, wherein the controller is further configured to cause the mobile robot to return to the charging station when a remaining battery power amount is less than a reference value.

* * * * *